(12) United States Patent
Irle et al.

(10) Patent No.: US 6,197,874 B1
(45) Date of Patent: Mar. 6, 2001

(54) POLYURETHANE-POLYACRYLATE HYBRID DISPERSIONS CONTAINING ALLOPHANATE GROUPS

(75) Inventors: Christoph Irle, Krefeld; Harald Blum, Leverkusen; Martin Brahm, Odenthal; Wolfgang Kremer, Kerken; Rolf Roschu, Willich; Erhard Lühmann, Leverkusen; Josef Pedain, Köln; Christian Wamprecht, Neuss, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/234,866

(22) Filed: Jan. 21, 1999

(30) Foreign Application Priority Data

Feb. 5, 1998 (DE) ............................................. 198 04 432

(51) Int. Cl.[7] ................. C08J 3/00; C08K 3/20; C08L 75/00; C08F 2/16; C08F 8/30
(52) U.S. Cl. ................. 524/507; 524/457; 524/458; 524/591; 524/800; 524/804; 524/839; 524/840; 525/123; 525/455
(58) Field of Search ................. 524/457, 458, 524/507, 591, 839, 804, 840, 800; 525/123, 455

(56) References Cited

U.S. PATENT DOCUMENTS

| | | | |
|---|---|---|---|
| 3,705,164 | 12/1972 | Honig et al. | 260/29.6 NR |
| 4,160,080 | 7/1979 | Koenig et al. | 528/59 |
| 4,644,030 | 2/1987 | Loewrigkeit et al. | 524/457 |
| 4,730,021 | 3/1988 | Zom et al. | 524/457 |
| 4,983,662 | 1/1991 | Overbeek et al. | 524/501 |
| 5,137,961 | 8/1992 | Goos et al. | 524/457 |
| 5,380,792 | 1/1995 | Renk | 524/840 |

FOREIGN PATENT DOCUMENTS

| | | |
|---|---|---|
| 0 469 389 | 4/1994 | (EP) . |
| 705 855 | 4/1996 | (EP) . |

*Primary Examiner*—Patrick D. Niland
(74) *Attorney, Agent, or Firm*—Joseph C. Gil; Thomas W. Roy

(57) ABSTRACT

The present invention relates to polyurethane-polyacrylate hybrid dispersions comprising A) 20 to 99% by weight, based on resin solids, of a polyurethane wherein i) the polyurethane is rendered hydrophilic by ionic and/or nonionic hydrophilic groups and ii) the polyisocyanate component used to prepare the polyurethane contains an aliphatic or cycloaliphatic polyisocyanate containing allophanate groups, and B) 1 to 80% by weight, based on resin solids) of a polyacrylate polymer, wherein the sum of components A and B is 100%, based on the total weight of A) and B). The present invention also relates to the use of these hybrid dispersions for coating substrates, in particular wood.

9 Claims, No Drawings

POLYURETHANE-POLYACRYLATE HYBRID DISPERSIONS CONTAINING ALLOPHANATE GROUPS

BACKGROUND OF THE INVENTION

1. Field of the Invention

The present invention relates to polyurethane-polyacrylate hybrid dispersions which contain allophanate groups and to their use for wood and furniture coatings which exhibit good resistance to staining liquids.

2. Description of the Prior Art

With the aim of reducing emissions of organic solvents, aqueous coating compositions are increasingly being used instead of solvent-containing compositions. Polyurethane dispersions and polyacrylate dispersions are important classes of aqueous lacquer binder vehicles. The various options for the production of polyurethane dispersions have been compared, for example, in a review article by D. Dieterich (D. Dieterich, Prog. Org. Coatings 9,281(1981)). Polyurethane dispersions and poly-acrylate dispersions are often mixed in order obtain high-quality surface properties.

Furthermore, it is also known, particularly from the patent literature, that the polymerization by a radical mechanism of suitable vinyl monomers can be conducted in the presence of aqueous polyurethane dispersions. Examples of patent applications relating to the production of polyurethane-polyacrylate hybrid dispersions such as these include DE-A-1,953,348 and EP-A 167,188, EP-A 189,945 and EP-A308, 115. When compared to a mixture of polyurethane and polyacrylate dispersions, the hybrid dispersions are of higher quality.

A considerable improvement of the performance of aqueous coatings has been achieved by the use of modern technologies. Thus, for example, EP 358 979 describes how the resistance of coatings prepared from aqueous acrylate dispersions can be improved by the addition of polyisocyanates. It is also possible to improve the coating properties of polyurethane dispersions by the addition of polyisocyanate crosslinking agents which have been rendered hydrophilic (e.g. EP-A 469,389).

In addition to the development of two-component systems of this type, attempts have been made to also achieve a significant improvement in coating properties for one-component systems, which can be applied more easily. Thus EP-A 332,326 describes how polyurethane-polyacrylate hybrid dispersions can be crosslinked by the condensation reaction of hydrazide and carbonyl groups. The oxidative crosslinking of polyurethane and polyurethane-polyacrylate hybrid dispersions is also known (Advances in Urethane Science and Technology, Volume 10, pages 121–162 (1987), 4th Nürnberg Congress "Creative Advances in Coatings Technology", Paper 17, (1997)).

The properties of lacquers can be somewhat improved by the process steps described above, but the chemical resistance of lacquer films of polyurethane-polyacrylate hybrid dispersions, particularly their resistance to staining liquids, is unsatisfactory.

An object of the present invention is to improve the properties of aqueous, one-component polyurethane-polyacrylate hybrid dispersions, and in particular their resistance to staining liquids.

This object may be achieved with the polyurethane-polyacrylate hybrid dispersions according to the invention, which are based on special polyurethane dispersions containing allophanate groups and exhibit a decisive improvement in resistance to staining liquids.

SUMMARY OF THE INVENTION

The present invention relates to polyurethane-polyacrylate hybrid dispersions comprising A) 20 to 99% by weight, based on resin solids, of a polyurethane wherein i) the polyurethane is rendered hydrophilic by ionic and/or nonionic hydrophilic groups and ii) the polyisocyanate component used to prepare the polyurethane contains an aliphatic or cycloaliphatic polyisocyanate containing allophanate groups, and B) 1 to 80% by weight, based on resin solids) of a polyacrylate polymer, wherein the sum of components A and B is 100%, based on the total weight of A) and B).

The present invention also relates to the use of these hybrid dispersions for coating substrates, in particular wood.

DETAILED DESCRIPTION OF THE INVENTION

The polyurethane-polyacrylate hybrid dispersions preferably contain polyurethanes A which are prepared from A1) an aliphatic or cycloaliphatic polyisocyanate component having an allophanate group content (calculated as the proportion by weight of allophanate groups $N_2C_2O_3H$, MW 101) of 5 to 35%, preferably 11 to 27%, based on the weight of polyisocyanate component A1),

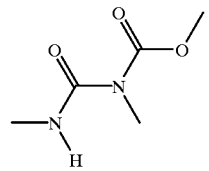

A2) an isocyanate-reactive component containing at least one polymeric compound having an OH number of 30 to 200 mg KOH/g and a number average molecular weight of 400 to 6000, A3) optionally one or more low molecular weight polyols and/or polyamines having an average molecular weight of less than 400, A4) optionally an isocyanate-reactive component containing at least one ionic or potential ionic group and A5) optionally a hydrophilic, polyoxyalkylene ether having a number average molecular weight of 250 to 3000 and containing one or more OH groups.

Suitable polyisocyanate components A1) are preferably produced by the reaction of aliphatic or cycloaliphatic diisocyanates $$R^1(NCO)_2$$

with aliphatic or cycloaliphatic alcohols $$R^2OH$$

in the presence of a catalyst,
wherein
$R^1$ represents an aliphatic hydrocarbon radical containing 4 to 12 carbon atoms or a cycloaliphatic hydrocarbon radical containing 6 to 15 carbon atoms and
$R^2$ represents an aliphatic or cycloaliphatic hydrocarbon radical containing 1 to 18, preferably 4 to 12 carbon atoms, which may be substituted by ether groups or with hydroxyl groups.

Examples of diisocyanates include tetramethylene diisocyanate, hexamethylene diisocyanate, diisocyanatocyclohexane, 1-methyl-2,4-isocyanatocyclohexane and 1-methyl-2,6-isocyanatocyclohexane. Preferred diisocyanates include 1-isocyanato-3,3,5-trimethyl-5-isocyanato-methylcyclohexane (isophorone diisocyanate) and bis-(4-isocyanato-cyclohexane)-methane. Mixtures of these diisocyanates with other diisocyanates corresponding the preceding formula are also suitable.

Examples of suitable alcohols include ethanol, n-propanol, isopropanol, n-butanol, n-pentanol, isopentanol, 2-ethylhexanol, hexadecanol, ethylene glycol monobutyl ether, diethylene glycol monobutyl ether, methoxypropanol, polyethers polyols, and diols, such as ethylene glycol or butanediol.

The preparation of allophanate group-containing polyisocyanates A1) from the diisocyanate and alcohol components is known and described in the literature. In one process a polyisocyanate and a suitable catalyst are placed in a vessel and the alcohol component is added. Alternatively, a urethane can first be produced from a polyisocyanate and an alcohol, which is then converted to the allophanate after the addition of a catalyst.

Suitable reaction conditions and catalysts are described, for example, in EP-A 712,840, EP-A 682,012, GB-A 994,890 or EP-A 659,791. Preferred catalysts are compounds containing tin or zinc, such as dibutyltin dilaurate, tin 2-ethylhexanoate, zinc acetylacetonate and zinc 2-ethylhexanoate.

Polyisocyanate component A1), which contains allophanate groups, is preferably prepared from 75 to 98% by weight, preferably 80 to 92% by weight, of aliphatic or cycloaliphatic polyisocyanates and 2 to 25% by weight, preferably 8 to 20% by weight, of aliphatic or cycloaliphatic alcohols, wherein the percentages are based on the total weight of polyisocyanate component A1).

Polyisocyanates which are free from allophanate groups can also be present in polyisocyanate component A1) in addition to the allophanate group-containing polyisocyanates.

Isocyanate-reactive compounds A2) are known from the field of polyurethane chemistry and include polyesters, polyester amides, poly-ethers (other than those falling within the scope of component A5), polythioethers, polycarbonates, polyacetals, polyolefines, polysiloxanes and epoxy resins. Polymeric compounds A2) may contain unsaturated groups. The polyols preferably have a number average molecular weight of 650 to 2500 and more preferably have an OH-functionality of 1.9 to 3. Preferred polyols, are polyether, polycarbonate and polyester polyols, preferably diols.

Component A3) is selected from polyols, aminopolyols and polyamines, which have molecular weights of less than 400 and are different from component A4). The use of these compounds as chain extenders for the preparation of polyurethanes and polyurethane dispersions is known in the art. Examples include ethylene glycol, 1,4-butanediol, cyclohexanedimethanol, neopentyl glycol, trimethylolpropane, glycerol, ethylenediamine, 1,4-diaminobutane, isophoronediamine, diethylenetriamine, triethylenetetramine, hydrazine and polyoxypropylenamines (e.g., the Jeffamine® polyamines available from Huntsman). These chain extenders preferably have an average functionality of 1.8 to 2.5.

A portion of the isocyanate groups may be reacted with unsaturated alcohol components, such as hydroxyethyl acrylate, hydroxyethyl methacrylate, trimethylolpropane mono- or diallyl ethers and allyl alcohol. In the subsequent polymerization by a free radical mechanism, the double bonds which are incorporated into the polyurethane serve as grafting locations.

Examples of low molecular weight compounds A4), which are capable of forming an ionic group, include dimethylolpropionic acid and N-methyl-diethanolamine.

Also suitable for use in preparing polyurethane A are polyoxyalkylene ethers A5), which have a number average molecular weight of 250 to 3000. These polyethers contain one or more OH groups, preferably one OH group, and are synthesized from ethylene oxide and propylene oxide. It is known that these substances impart hydrophilic properties and improve the dispersibility of the polyurethane in water.

The preparation of the aqueous PUR dispersions is carried out in known manner. After the production of polyisocyanate component A1), which contains allophanate groups and optionally contains unreacted monomer, it is reacted to completion in a second reaction step with polyol component A2) and optionally with low molecular weight chain extenders A3) and A4) to form a polyurethane. A solvent may optionally and advantageously be used, preferably a solvent which can subsequently be separated, if necessary.

In the third step the groups which are capable of neutralization are converted into salts and the polyurethane is dispersed in water. Any residual NCO groups either react with water or with chain extenders, preferably low molecular weight polyamines, which may be added to water either before, during or after dispersion. If a low-boiling solvent is used, it can be separated and recovered by distillation.

Depending on the amount of hydrophilic groups, the dispersion can be obtained in a very finely divided form, so that it practically has the appearance of a solution. Very coarse particulate dispersions, which are also satisfactorily stable, may also be formed. The solids content can be varied within wide limits, e.g., from 20 to 50% by weight.

The resulting polyurethane dispersion, which contains allophanate groups, is modified in a second step with polyacrylate polymer B to produce the hybrid dispersion. It is possible to mix a previously prepared polyacrylate dispersion with the polyurethane dispersion or, preferably, the polyacrylate dispersion is prepared by emulsion polymerization in the presence of the polyurethane dispersion. The amount of polymerizable monomers is 1 to 80% by weight, preferably 10 to 60% by weight, based on the total resin solids content of the polyurethane-polyacrylate hybrid dispersion.

Examples of suitable monomers include styrene; esters of (meth)acrylic acid containing 1 to 18 carbon atoms in the alcohol radical, such as methyl methacrylate, butyl methacrylate, ethyl acrylate, butyl acrylate, cyclohexyl acrylate, 2-ethylhexyl acrylate and stearyl acrylate; di(meth) acrylic acid esters of diols, e.g. ethylene glycol, 1,4-butanediol or 1,6-hexanediol; (meth)acrylamide or (meth) acrylonitrile; and vinyl esters of aliphatic carboxylic acids containing 2 to 12 carbon atoms, such as vinyl acetate or versatic acid vinyl ester. Also suitable are monomers containing functional groups, e.g., hydroxy, carbonyl or acid groups, such as hydroxyethyl acrylate, hydroxyethyl methacrylate, hydroxypropyl methacrylate, acetoacetoxyethyl methacrylate, acrylic acid and methacrylic acid. Acid-functional monomers are less preferred.

Preferred polyacrylate polymers B) have an acid number of less than 10 mg KOH/g and an OH number of 0 to 120 mg KOH/g; and are synthesized from 20 to 100% by weight of acrylic acid, methacrylic acid and esters thereof and 0 to 80% by weight of styrene, wherein all of the preceding ranges are based on the resin solids content of polyacrylate polymer B).

Polymerization is preferably carried out by aqueous emulsion polymerization of the previously mentioned monomers and is initiated using radical initiators. The emulsion polymerization is preferably conducted in the presence of polyurethane dispersion A. The emulsion polymerization can be carried out according to several embodiments. In one embodiment the polyurethane dispersion and/or a surface-active substance is added to the reaction vessel and then the monomers and initiator are added separately over a defined period of time, e.g., 0.5 to 6 hours. In a second embodiment a portion of the polyurethane dispersion and/or a surface-active substance is added to the reaction vessel and the remainder as well as the monomers and initiator are separately added over a defined period of time, e.g., 0.5 to 6 hours. In a third embodiment the polyurethane dispersion and/or a surface-active substance, the monomers and the initiator are added separately and continuously over the entire period of polymerization, with only a defined amount of water being initially placed in the reaction vessel. In a fourth embodiment, i.e., a batch process, the polyurethane dispersion and/or a surface-active substance, the monomer mixture and the initiator are added to the reaction vessel together, heated to the desired polymerization temperature, and held at this temperature for 2 to 10 hours.

Examples of suitable initiators include peroxides such as potassium peroxy-disulphate, ammonium peroxydisulphate, organic peroxides, organic hydroperoxides and hydrogen peroxide. Redox systems are preferably used, such as water-soluble, radical-producing non-ionogenic peroxides, e.g. t-butyl hydroperoxide, as the oxidation component, and reduction components such as formaldehyde sulphoxylate or ascorbic acid, with catalytic amounts of an iron(II) salt (about $10^{-4}$ to $10^{-1}$ moles).

Emulsion polymerization is generally conducted at temperatures of 20° C. to 100° C., preferably 40° C. to 65° C.

After the polymerization reaction a finely divided aqueous polymer emulsion is obtained, which has an average particle diameter of 15 to 350 nm, preferably 30 to 150 nm, as measured by laser correlation spectroscopy.

Apart from homo- and/or copolymers obtained from the monomers or monomer mixtures used for polymerization, the dispersion also contains graft products of the monomers, which have been grafted either onto double bonds (via the incorporation of unsaturated OH components) or onto the polymer chains of the polyurethane as the graft base. Grafting reactions such as these are known and described, e.g., in Fortschritte der Hochpolymer-Forschung 1, 300 (1959), DE 1,953,348.

The polyurethane-polyacrylate hybrid dispersions according to the invention can be used as binders for aqueous coating compositions. In order to achieve an additional improvement in properties, up to 25% by weight, preferably up to 15% by weight, based on the resin solids content of the polyurethane-polyacrylate hybrid dispersion, of polyisocyanates can be added to these dispersions prior to application.

Suitable polyisocyanates include those described in U.S. Pat. Nos. 4,663,377 and 5,200,489 (both of which are herein incorporated by reference), which describe hydrophilic polyisocyanates and the hydrophobic polyisocyanates that can be modified to obtain the hydrophilic polyisocyanates. Examples of these polyisocyanates include polyisocyanates which have been rendered hydrophilic, such as Bayhydur 3100 (Bayer AG), or hydrophobic polyisocyanates, such as Desmodur 3300, Desmodur 3400 or Desmodur VP LS 2025 (Bayer AG).

The polyurethane-polyacrylate hybrid dispersions according to the invention can be used together with other binders, such as water-dispersible alkyd resins, or polyurethane, polyacrylate or polybutadiene oil dispersions.

The polyurethane-polyacrylate hybrid dispersions according to the invention are preferably used for coatings, most preferably for coating wood and plastics.

The invention is further illustrated but is not intended to be limited by the following examples in which all parts and percentages are by weight unless otherwise specified.

EXAMPLES

I. Polyisocyanate component A1) containing allophanate groups

I-a Polyisocyanate component A1) containing allophanate groups and based on methylene-bis-(4-isocyanatocyclohexane) and n-butanol 914 g of methylene-bis-(4-isocyanatocyclohexane) (Desmodur W, Bayer AG) and 0.5 g of a catalyst (Desmorapid SO, Bayer AG) were heated to 60° C. 86 g of n-butanol were then added over 25 minutes, accompanied by an exothermic reaction. During the addition, the temperature was adjusted to 110° C. by cooling. The batch was subsequently stirred at a temperature of 110° C. An NCO content of 19.7% was reached after 7 hours. The calculated allophanate group content of the polyisocyanate component was 11.7% by weight.

I-b Polyisocyanate component A1) containing allophanate groups and based on isophorone diisocyanate and n-butanol 1332 g of isophorone diisocyanate and 0.074 g of isophthalic acid dichloride were heated to 60° C. 148 g of n-butanol were then added over 30 minutes, accompanied by an exothermic reaction. During the addition, the temperature was adjusted to 90° C. by cooling. The batch was subsequently stirred at a temperature of 90° C. An NCO content of 22.9% was reached after 18 hours. The calculated allophanate group content of the polyisocyanate component was 13.6% by weight.

I-c Polyisocyanate component A1) containing allophanate groups and based on isophorone diisocyanate, methylene-bis-(4-isocyanatocyclohexane) and n-butanol 222.3 g of isophorone diisocyanate, 262 g of methylene-bis-(4-isocyanato-cyclohexane) and 0.4 g of the catalyst from Example 1 were heated to 60° C. 74 g of n-butanol were then added over 30 minutes, accompanied by an exothermic reaction. The batch was heated to 110° C., and was subsequently stirred at a temperature of 110° C. An NCO content of 14.4% was reached after 6 hours. The calculated allophanate-group content of the polyisocyanate component was 18.1% by weight.

I-d Polyisocyanate component A1) containing allophanate groups and based on hexamethylene diisocyanate, isophorone diisocyanate and n-butanol 336 g of hexamethylene diisocyanate and 268 g of N-methylpyrrolidone were heated to 60° C. 296 g of n-butanol were added over 30 minutes. The batch was heated by the exothermic reaction. During the addition, the temperature was adjusted to 100° C. by cooling. After the addition was complete, the batch was held at 100° C. for a further 5 hours (NCO content <0.1%). A further 238 g of N-methylpyrrolidone, 3.8 g of zinc 2-ethylhexanoate, 0.4 g of isophthalic acid dichloride and 888 g of isophorone diisocyanate were then added and the batch was heated to 90° C. An NCO content of 8.0% was reached after 7 hours. The calculated allophanate group content of the polyisocyanate component was 26.6% by weight.

II. Polyurethane dispersions

II-a Polyurethane dispersion based on polyisocyanate I-a 286 g of poly(tetrahydrofuran), 41 g of cyclohexanedimethanol, 58 g of dimethylolpropionic acid and 413 g of N-methylpyrrolidone were heated to 70° C. in a 2 liter, four-necked flask. As soon as a clear solution was formed, 659 g of polyisocyanate I-a were added. The batch was held for 2 hours at 100° C. (NCO content 3.2%). After cooling to 80° C., 44 g of triethylamine were added and homogenized for 30 minutes with stirring. 1250 g of the resulting prepolymer solution were added with stirring to a second flask containing 1537 g of water (temperature 40° C.). 10 g of ethylene diamine and 11 g of diethylene triamine, dissolved in 171 g of water, were then added over 30 minutes. The batch was subsequently filtered. The product was a polyurethane dispersion having the following properties:

Average particle size
(from laser correlation spectroscopy; LCS): 25 nm
Resin solids content: 34.2%
pH: 8.2

II-b Comparison example: a polyurethane dispersion similar to II-a, but based on a diisocyanate free from allophanate groups 275 g of poly(tetrahydrofuran), 54 g of cyclohexanedimethanol, 42 g of dimethylolpropionic acid and 301 g of N-methylpyrrolidone were heated to 70° C. in a 2 liter, four-necked flask. As soon as a clear solution was formed, 389 g of methylene-bis-(4-isocyanatocyclohexane) were added. The batch was held for 2 hours at 100° C. (NCO content 4.6%). After cooling to 50° C., 41 g of triethylamine were added and homogenized for 30 minutes with stirring. 900 g of the resulting prepolymer solution was added with stirring to a second flask containing 831 g of water (temperature 40° C.). 9 g of ethylene diamine and 10 g of diethylene triamine, dissolved in 92 g of water, were then added over 30 minutes. The batch was subsequently filtered. The product was a polyurethane dispersion having the following properties:

Average particle size (LCS): 36 nm
Resin solids content: 37.1%
pH: 7.8

II-c Comparison example: a polyurethane dispersion similar to II-b, but with a higher proportion of hard segments 196 g of poly(tetrahydrofuran), 28 g of cyclohexanedimethanol, 33 g of ethylene glycol, 40 g of dimethylolpropionic acid and 276 g of N-methylpyrrolidone were heated to 70° C. in a 2 liter, four-necked flask. As soon as a clear solution was formed, 414 g of methylene-bis-(4-isocyanatocyclohexane) were added. The batch was held for 3 hours at 100° C. (NCO content 3.9%). After cooling to 50° C., 30 g of triethylamine were added and homogenized for 30 minutes with stirring. 850 g of the resulting prepolymer solution were added with stirring to a second flask containing 794 g of water (temperature 40° C.). 7 g of ethylene diamine and 8 g of diethylene triamine, dissolved in 92 g of water, were then added over 30 minutes. The batch was subsequently filtered. The product was a polyurethane dispersion having the following properties:

Average particle size (LCS): 26 nm
Resin solids content: 37.1%
pH: 7.8

II-d Polyurethane dispersion based on polyisocyanate I-b 196 g of poly(tetrahydrofuran), 32 g of cyclohexanedimethanol, 36 g of dimethylolpropionic acid and 259 g of N-methylpyrrolidone were heated to 70° C. in a 2 liter, four-necked flask. As soon as a clear solution was formed, 389 g of polyisocyanate I-b were added. The batch was held for 2 hours at 100° C. (NCO content 3.7%). After cooling to 55° C., 27 g of triethylamine were added and homogenized for 30 minutes with stirring. 800 g of the resulting prepolymer solution were added with stirring to a second flask containing 743 g of water (temperature 40° C.). 7 g of ethylene diamine and 8 g of diethylene triamine, dissolved in 82 g of water, were then added over 30 minutes. The batch was subsequently filtered. The product was a polyurethane dispersion having the following properties:

Average particle size (LCS): 41 nm
Resin solids content: 35.9%
pH: 7.6

III. Polyurethane-polyacrylate hybrid dispersions

III-a Polyurethane-polyacrylate hybrid dispersion based on polyurethane dispersion II-a 2478 g of polyurethane dispersion II-a (847 g of resin solids), 733 g of water, 4 g of a 1% solution of iron(II) sulphate in water and 4 g of a 1% solution of ethylenediamine-tetraacetat in water were heated to 50° C. 25% of each of solutions I, II and III (see below) were added over 5 minutes with stirring. A slight exothermic effect indicated the commencement of the polymerization reaction. The reaction mixture was stirred for 30 minutes at 50° C., and then the remaining 75% of solutions I, II and III were added in parallel over a period of 1 hour. The mixture was allowed to react for a further 1 hour, and was then cooled to 25° C. The mixture was filtered (T5500 filter, supplied by Seitz). The dispersion had the following properties:

Average particle size (LCS): 40 nm
Resin solids content: 34.4% pH: 7.8

| | |
|---|---|
| Solution I: | 578 g of methyl methacrylate, 272 g of butyl acrylate |
| Solution II: | 3.8 g of Na formaldehyde sulphoxylate, dissolved in 379 g of water |
| Solution III: | 8.5 g of t-butyl hydroperoxide (70% in water), dissolved in 425 g of water |

III-b Comparison example: a polyurethane-polyacrylate hybrid dispersion based on polyurethane dispersion II-b The preparation of hybrid dispersion III-a was repeated except that polyurethane dispersion II-b was used instead of polyurethane dispersion II-a. The final product had the following properties:

Average particle size (LCS): 46 nm
Resin solids content: 36.0%
pH: 8.5

III-c Comparison example: a polyurethane-polyacrylate hybrid dispersion based on polyurethane dispersion II-c The preparation of hybrid dispersion II-a was repeated except that polyurethane dispersion II-c was used instead of polyurethane dispersion II-a. The final product had the following properties:

Average particle size (LCS): 27 nm
Resin solids content: 35.5%
pH: 8.0

III-d Polyurethane-polyacrylate hybrid dispersion based on from polyurethane dispersion II-d The preparation of hybrid dispersion III-a was repeated except that polyurethane dispersion II-d was used instead of polyurethane dispersion II-a. The final product had the following properties:

Average particle size (LCS): 52 nm
Resin solids content: 36.5%
pH: 8.2

IV-a to IV-d Formulation of clear coating compositions from polyurethane dispersions II-a to II-d The following formulation additives were added to 100 parts by weight of each of dispersions II-a to II-d:

0.2 parts by weight of an anti-foaming agent (Tego Foamex 805, Tego Chemie, as supplied)

0.5 parts by weight of an additive for improving the wetting of the substrate (Byk 346, Byk Chemie, as supplied)

1.0 part by weight of a thickener (Acrysol RM8, Rohm and Haas, 5% in water)

V-a to V-d Formulation of clear coating compositions from polyurethane-polyacrylate hybrid dispersions III-a to III-d For the formulation of a clear lacquer, the following formulation constituents were added to 100 parts by weight of each of dispersions III-a to III-d:

10 parts by weight of a 1:1 mixture of butyl glycol and water 0.2 parts by weight of an anti-foaming agent (Tego Foamex 805, Tego Chemie, as supplied)

0.5 parts by weight of an additive for improving the wetting of the substrate (Byk 346, Byk Chemie, as supplied)

1.0 part by weight of a thickener (Acrysol RM8, Rohm and Haas, 5% in water)

Testing of the clear coating compositions:

The resistance to staining liquids was tested according to DIN 68 861. The coating compositions were applied to a white pasteboard card at a wet film thickness of 200 μm. After drying for 7 days at room temperature, the surface was wetted for 5 hours with red wine and mustard and for 16 hours with coffee. The deposit was then wiped off and after 10 days the damage was assessed on a scale of 0 (no change) to 5 (strong discoloration).

| Example | Binder vehicle | Resistance according to DIN 68861 | | |
|---|---|---|---|---|
| | | Coffee | Red wine | Mustard |
| IV-a | Polyurethane dispersion, allophanate-modified | 2 | 0–1 | 1 |
| IV-b | Polyurethane dispersion, comparison | 5 | 2–3 | 1–2 |
| IV-c | Polyurethane dispersion, comparison | 3–4 | 3 | 4 |
| IV-d | Polyurethane dispersion, allophanate-modified | 3 | 2 | 3 |
| V-a | Hybrid dispersion, allophanate-modified | 1 | 0–1 | 0–1 |
| V-b | Hybrid dispersion, comparison | 4 | 1 | 1–2 |
| V-c | Hybrid dispersion, comparison | 3 | 3 | 3 |
| V-d | Hybrid dispersion, allophanate-modified | 0 | 0 | 2 |

The test results demonstrate that the resistance to staining liquids is improved by the polymerization of acrylate monomers in the presence of polyurethane dispersions. It is also clear that a further improvement in this resistance is achieved, both for polyurethane dispersions and for polyurethane-polyacrylate hybrid dispersions, by the incorporation of allophanate groups into the polyisocyanate starting material.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An aqueous polyurethane-polyacrylate hybrid dispersion comprising
    A) 20 to 99% by weight, based on resin solids, of a polyurethane wherein i) the polyurethane is rendered hydrophilic by ionic and/or nonionic hydrophilic groups and ii) the polyisocyanate component used to prepare the polyurethane comprises an aliphatic or cycloaliphatic polyisocyanate containing allophanate groups, and
    B) 1 to 80% by weight (with respect to the total solids content) of a polyacrylate polymer,
wherein the sum of components A and B is 100%, based on the total weight of A) and B).

2. The polyurethane-polyacrylate hybrid dispersion of claim 1 wherein polyacrylate polymer B is produced in the presence of polyurethane dispersion A by free radical emulsion polymerization.

3. The polyurethane-polyacrylate hybrid dispersion claim 1 wherein polyurethane dispersion A) is the reaction product of
    A1) an aliphatic or cycloaliphatic polyisocyanate component having an allophanate group content (calculated as $N_2C_2O_3H$, MW 101) of 5 to 35%, based on weight of polyisocyanate component A1),
    A2) an isocyanate-reactive component containing at least one polymeric compound having an OH number of 30 to 200 mg KOH/g and a number average molecular weight of 400 to 6000,
    A3) optionally one or more low molecular weight polyols and/or polyamines having an average molecular weight of less than 400,
    A4) an isocyanate-reactive component containing at least one ionic or potential ionic group and
    A5) optionally a hydrophilic, polyoxyalkylene ether having a number average molecular weight of 250 to 3000 and containing one or more OH groups.

4. The polyurethane-polyacrylate hybrid dispersion of claim 1 herein aliphatic or cycloaliphatic polyisocyanate component A1) has an allophanate group content (calculated as $N_2C_2O_3H$, MW 101) of 11 to 27%, based on weight of polyisocyanate component A1).

5. The polyurethane-polyacrylate hybrid dispersion of claim 1 wherein component A2) is a polyester, polyether or polycarbonate polyol having with a number average molecular weight of 650 to 2500 and a functionality of 1.9 to 3.

6. The polyurethane-polyacrylate hybrid dispersion of claim 1 wherein polyacrylate polymer B) has an acid number of less than 10 mg KOH/g and an OH number of 0 to 120 mg KOH/g, and is synthesized from 20 to 100% by weight of acrylic acid, methacrylic acid and esters thereof and 0 to 80% by weight of styrene, wherein all of the preceding ranges are based on the resin solids content of polyacrylate polymer B).

7. A coating composition containing as binder the polyurethane-polyacrylate hybrid dispersion of claim 1.

8. A coating composition containing as binder the polyurethane-polyacrylate hybrid dispersion of claim 1 and a positive amount of up to 25% by weight, based on the resin solids content of the polyurethane-polyacrylate hybrid dispersion, of a polyisocyanate containing free isocyanate groups.

9. A coating composition containing as binder the polyurethane-polyacrylate hybrid dispersion of claim 1 and a positive amount of up to 25% by weight, based on the resin solids content of the polyurethane-polyacrylate hybrid dispersion, of a hydrophilic polyisocyanate containing free isocyanate groups.

* * * * *